United States Patent [19]
Ariga

[11] 3,898,794
[45] Aug. 12, 1975

[54] POWER PLANT
[75] Inventor: Hajime Ariga, Yokohama, Japan
[73] Assignee: Nissan Motor Company Limited, Japan
[22] Filed: Mar. 26, 1973
[21] Appl. No.: 344,618

[30] Foreign Application Priority Data
Apr. 1, 1972 Japan.............................. 47-32808
Apr. 25, 1972 Japan.............................. 47-41669

[52] U.S. Cl......... 60/39.18 R; 60/39.46 M; 60/259
[51] Int. Cl. .............................................. F02c 3/20
[58] Field of Search..... 60/39.46, 39.18 R, 39.18 A, 60/259, 49

[56] References Cited
UNITED STATES PATENTS

| | | | |
|---|---|---|---|
| 2,450,950 | 10/1948 | Goddard.......................... | 60/DIG. 8 |
| 2,852,916 | 9/1958 | Hearn et al. ........................... | 60/259 |
| 2,926,492 | 3/1960 | Flanagan........................... | 60/39.46 |
| 3,229,462 | 1/1966 | Fatica ................................ | 60/39.55 |
| 3,581,504 | 6/1971 | Andrus ............................... | 60/39.46 |
| 3,740,945 | 6/1973 | Lovingham ........................... | 60/259 |

OTHER PUBLICATIONS
Power Plant Engineering, "Other Mechanical Developments," January 1947, p. 79.

Primary Examiner—William L. Freeh
Assistant Examiner—O. T. Sessions
Attorney, Agent, or Firm—Robert E. Burns; Emmanuel J. Lobato; Bruce L. Adams

[57] ABSTRACT

A power plant adapted to be driven by a flow of high-temperature gases, in which hydrogen peroxide is supplied into a feed chamber and delivered through a catalyst for exothermal decomposition into water vapour and oxygen, and into a combustion chamber in which the water vapour and oxygen are utilized through combustion of fuel to produce high-temperature gases which flow through a venturi portion leading from the combustion chamber into a gas flow passage thereby driving a turbine wheel located therein. The power plant includes first and second throttle valves for controlling the supply of hydrogen peroxide and fuel into the feed chamber and the combustion chamber, respectively. The power plant may also include an energy storing device employing a flywheel connected to an output shaft of the turbine wheel to store energy therein, and means for controlling the first and second throttle valves so as to maintain the rotational speed of the flywheel at a desired predetermined value.

7 Claims, 3 Drawing Figures

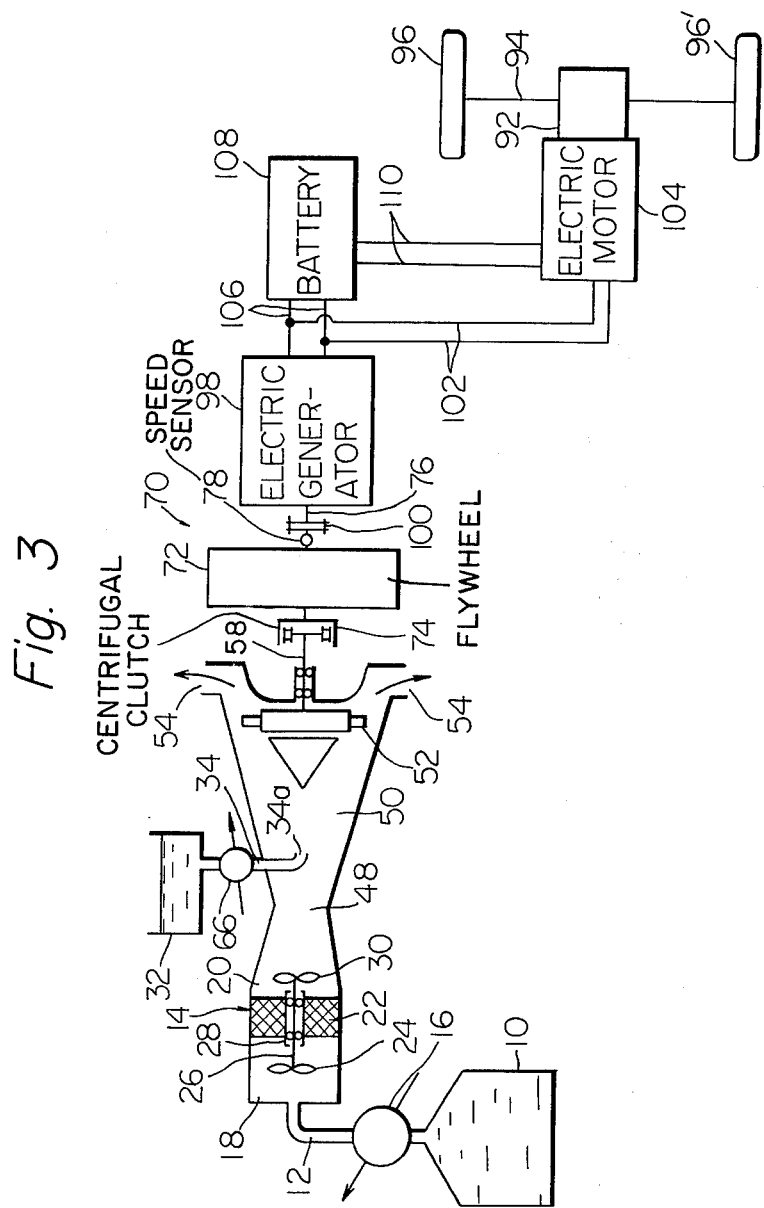

POWER PLANT

This invention relates in general to power plants for driving vehicles, ships, and industrial equipment such as electrical generators, and, more particularly, to a gas turbine which is adapted to be driven by a flow of high-temperature gases and which employs hydrogen peroxide as an oxidizing agent for combustion of liquid fuel.

As is well known in the art, a conventional gas turbine is usually comprised of an air compressor, a gas producing turbine, and a power turbine. Since the gas producing turbine and the power turbine are rotatably mounted on two shafts which are axially aligned with the axis of the air compressor, the gas turbine is complicated in construction, and its operating performance efficiency is low. Since, moreover, the prior art gas turbine is arranged to use air as an oxidizing agent for combustion of fuel, it is impossible to reduce the amount of nitrogen oxides in exhaust gases emitted from the gas turbine.

It is, therefore, an object of the present invention to provide a power plant which is simple in construction and economical to manufacture.

Another object of the present invention is to provide a power plant which is capable of minimizing the amount of nitrogen oxides in exhaust gases emitted from the power plant.

Another object of the present invention is to provide a power plant which is constituted by a minimum number of component parts to provide a compact construction.

Still another object of the present invention is to provide a power plant which is adapted to employ hydrogen peroxide as an oxidizing agent for combustion of fuel, whereby an air compressor, gas producing turbine, and associated parts can be dispensed with.

A further object of the present invention is to provide a power plant which is suitable for driving vehicles, ships, aircraft and industrial equipment such as electrical generators.

In order to achieve these objects, the present invention contemplates provision of an improved power plant employing hydrogen peroxide as an oxidizing agent for combustion of fuel. The power plant generally includes a source of hydrogen peroxide and a source of liquid fuel. The source of hydrogen peroxide communicates through a throttle valve with a feed chamber formed in a casing in which a combustion chamber is also formed. A catalyst, which may be based on silver, is disposed in the casing between the feed chamber and the combustion chamber. The catalyst serves to exothermically decompose the hydrogen peroxide fed from the source of hydrogen peroxide through the feed chamber and into the catalyst into water vapour and oxygen. The gas mixture of water vapour and oxygen thus produced is utilized for driving a turbine located in the combustion chamber and rotatably mounted on one end of a rotary shaft supported by the catalyst and extending between the feed chamber and the combustion chamber. A pump is fixed to the other end of the rotary shaft in the feed chamber, and is thus rotated by the rotary shaft for feeding hydrogen peroxide into the feed chamber from the source of hydrogen peroxide through the throttle valve. In a first preferred embodiment, liquid fuel is supplied into the combustion chamber through a conduit in which a fuel pump is operatively disposed. The fuel pump is connected to and driven by a shaft on which a turbine is rotatably mounted. This turbine is rotated by a flow of water vapour and oxygen delivered from the combustion chamber through a suitable channeling means thereby rotating the fuel pump for supplying liquid fuel into the combustion chamber. The liquid fuel thus fed into the combustion chamber is combusted by oxygen in the combustion chamber thereby producing a supply of high-temperature gases. The high-temperature gases pass through a venturi portion communicating with the combustion chamber and are diluted by air therein introduced from an air nozzle opening to the atmosphere so that the temperature of the working gases is reduced to a proper level while the volume of working gases is increased to satisfactorily drive a turbine wheel of the power plant. In a second preferred embodiment, the power plant generally comprises a source of hydrogen peroxide, a throttle valve communicating with the source of hydrogen peroxide, a feed chamber communicating with the source of hydrogen peroxide through the throttle valve, a combustion chamber, a catalyst disposed between the feed chamber and the combustion chamber, a turbine and pump assembly mounted on a rotary shaft supported by the catalyst, a venturi portion leading from the combustion chamber, a source of fuel communicating with the venturi portion through a conduit, an additional throttle valve located in the conduit, and a turbine wheel driven by a flow of high-temperature gases passed from the venturi portion. The power plant also comprises an energy storing device employing a flywheel connected through a centrifugally operated clutch to an output shaft of the turbine wheel, and a speed sensor operatively mounted on a shaft connected to the flywheel. The speed sensor is adapted to sense the rotational speed of the shaft connected to the flywheel, and is electrically connected to the throttle valves for controlling the supply of hydrogen peroxide and liquid fuel into the feed chamber and the combustion chamber, respectively, in response to the rotational speed detected, so as to maintain the rotational speed of the flywheel at a predetermined constant level. In a third preferred embodiment, the energy storing device of the power plant further comprises an electrical generator which is connected to the flywheel through a shaft and driven thereby to produce electrical power. This electrical generator may be connected to suitable utilization devices.

These and other features and advantages of the present invention will become more apparent from the following description when taken in conjunction with the accompanying drawings, in which:

FIG. 3 is a view similar to FIG. 2 but shows still another preferred embodiment of the power plant according to the present invention.

Figure 1:
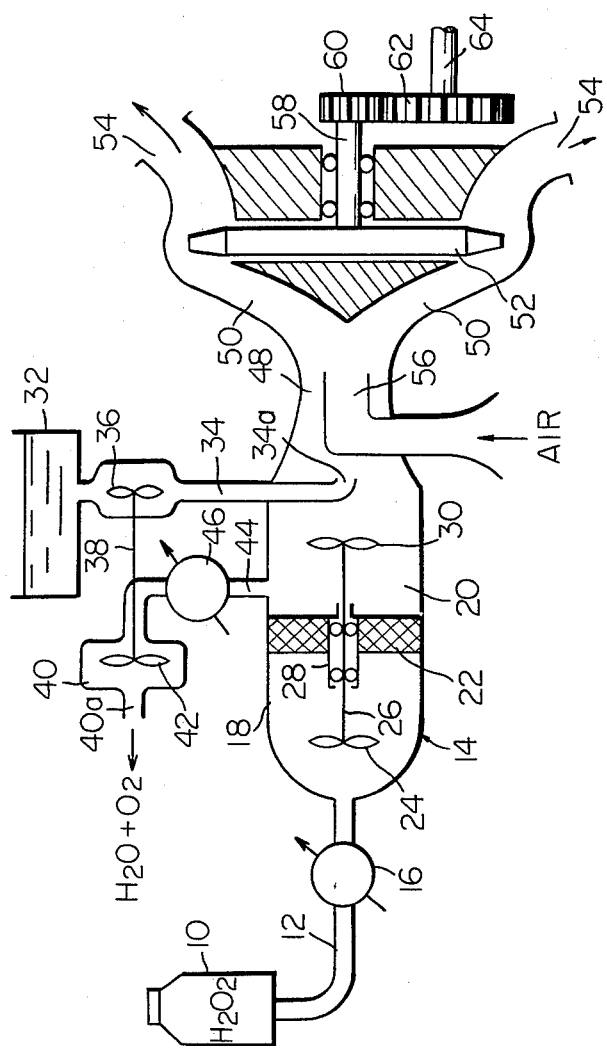
FIG. 1 is a schematic view of a preferred embodiment of the power plant according to the present invention.

Referring now to FIG. 1 of the drawings, there is schematically shown a preferred embodiment of a power plant according to the present invention. As shown, the power plant generally includes a source of hydrogen peroxide such as a tank 10 containing therein liquid hydrogen peroxide. The liquid hydrogen peroxide is utilized as an oxidizing agent for combustion of fuel as will be subsequently described in detail. The source 10 of hydrogen peroxide is connected to a conduit 12, which in turn is connected to a casing or housing 14. Located in the conduit 12 is a throttle valve 16 which controls the flow of hydrogen peroxide passing through the conduit 12 in response to the torque demands of the power plant. The throttle valve 16, which may be of any suitable construction, is controlled in a manner as will be discussed hereinafter.

The casing 14 has formed therein a feed chamber 18 and a combustion chamber 20, which are in axial alignment with each other. A catalyst 22, which may be based on silver, is located in the casing 14 between the feed chamber 18 and the combustion chamber 20, and functions to exothermically decompose hydrogen peroxide into water vapour and oxygen which are utilized for combustion of fuel. The feed chamber 18 communicates through the throttle valve 16 and the conduit 12 with the source 10 of hydrogen peroxide, and is supplied with hydrogen peroxide therefrom by the action of a pump 24. The pump 24 is operatively disposed in the feed chamber 18 and is rotatably mounted at one end of a common shaft 26. The common shaft 26 is journalled in a bearing 28 supported by the catalyst 22, and extends between the feed chamber 18 and the combustion chamber 20. A turbine 30 is rotatably mounted at the other end of the common shaft 26, and is driven by water vapour and oxygen ejected from the catalyst 22. In this manner, the common shaft 26 and accordingly the pump 24 are rotated to continue feeding hydrogen peroxide into the catalyst 22.

As shown in FIG. 1, the power plant also comprises a source of fuel such as a tank 32 containing fuel therein, which communicates with a fuel supply pipe 34. The fuel may be a mixture of liquid phase hydrocarbons or a hydrogen containing combustible gas. The fuel supply pipe 34 has at its lowermost end a fuel jet nozzle 34a, which opens into the combustion chamber 20 downstream of the turbine 30. Preferably, a fuel pump 36 may be disposed in the fuel supply pipe 34 for satisfactorily feeding fuel into the combustion chamber 20. The fuel pump 36 is connected to one end of a common shaft 38 which extends into a water vapour chamber 40 and has connected to its other end a turbine 42. The water vapour chamber 40 communicates through a conduit 44 with the combustion chamber 20 so that water vapour and oxygen from the decomposed hydrogen peroxide are delivered into the water vapour chamber 40. The water vapour and oxygen delivered into the water vapour chamber 40 drive the turbine 42 cooperating with the pump 36, and discharge into the atmosphere through a vent 40a. A flow control valve 46 is disposed in the conduit 44 and controls the flow of water vapour and oxygen passing through the conduit 44. This flow control valve 46 is controlled so as to vary the flow of water vapour and oxygen supplied through the conduit 44 in response to the torque demands of the power plant, which are determined by a suitable means which is not shown.

As previously mentioned hereinabove, the hydrogen peroxide is exothermically decomposed into water vapour and oxygen when it is brought into contact with the catalyst 22, in a manner as follows:

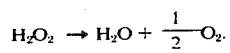

The exothermic decomposition of hydrogen peroxide is accompanied by generation of heat, the temperature rises to about 700°C, and the mixture of water vapour and oxygen contains nascent oxygen in a copious amount such that the gases thus produced are chemically extremely reactive. If, therefore, the hot gas mixture of water vapour and oxygen are brought into contact with the fuel, combustion of the fuel will take place thereby producing high-temperature gases, the temperature of which reach about 2000°C. The high-temperature temperature gases thus produced are then passed through a venturi portion 48 formed in the casing 14 into a gas flow passage 50, in which a portion of a turbine wheel 52 is exposed to the gas flow, so that the gases impinge upon the blades of the turbine wheel 52 and are discharged into the atmosphere through an exhaust 54 communicating with the passage 50.

The temperature of the gases, however, which is about 2000°C, is excessive, and the volume of gases impinging upon the turbine blades is insufficient for satisfactorily driving the turbine wheel 52. For this reason, air may be mixed with the high-temperature gases so that the temperature of the gases is reduced to a proper level, and the volume thereof is increased to a sufficient value. To this end, and air nozzle 56, which is vented to the atmosphere, is located in the venturi portion 48 so that air is drawn into the venturi portion 48 due to the vacuum existing in venturi portion 48. Thus, air introduced into the venturi portion 48 dilutes the high-temperature gases thereby reducing the temperature thereof to a proper level while increasing the volume of gases operatively acting on the turbine blades of the turbine wheel 52.

The turbine wheel 52 is rotatably mounted on an output shaft 58 which carries thereon a speed reduction gear 60 meshing with a gear 62 mounted on a shaft 64. Thus, power is transmitted to the shaft 64 through the gears 60 and 62 connected to the shafts 58 and 64, respectively.

When, in operation, the throttle valve 16 is opened, hydrogen peroxide is fed through the conduit 12 into the feed chamber 18 and penetrates into the catalyst 22. The hydrogen peroxide thus contacts the catalyst 22 and is exothermically decomposed into water vapour and oxygen. The water vapour and oxygen are ejected from the right-hand surface (in FIG. 1) of the catalyst 22, and cause rotation of the turbine 30 and accordingly the pump 24. Hydrogen peroxide is in this manner continuously supplied into the feed chamber 18 through the conduit 12 and the throttle valve 16 from the source 10 of hydrogen peroxide. The water vapour and oxygen in the combustion chamber 20 are delivered through the conduit 44 and the flow control valve 46 into the water vapour chamber 40, thereby rotating the turbine 42 cooperating with the fuel pump 36. Thus, the fuel pump 36 is driven so that liquid fuel is supplied through the conduit 34 into the combustion chamber 20 downstream of the turbine 30. Since, as already explained hereinabove, the temperature of the gas mixture of water vapour and oxygen reaches a level of, for example, 700°C, the fuel fed into the combustion chamber downstream of the turbine 30 is instantly combusted when it contacts the water vapour-oxygen gas mixture thereby producing high-temperature gases. The high-temperature gases thus produced pass through the venturi portion 48 at a high velocity, thus producing a vacuum in the venturi portion 48.

Thereby, air is sucked into the venturi portion 48 through the air nozzle 56 upstream of the gas flow passage 50, and is mixed with water vapour and oxygen thus diluting this mixture and reducing the temperature thereof to a proper level while increasing the volume of working gases. The working gases flow into the gas flow passage 50 and impinge upon the turbine blades of the turbine wheel 52 thereby rotating the same. Thereafter, the working gases are discharged from the exhaust 54. The power output is thus transferred to the shaft 58 and transmitted through gears 60 and 62 to the shaft 64.

It is to be noted that the output power of the power plant is controlled by varying the degree of opening of one or both of the throttle valve 16 and the flow control valve 46 for thereby metering the amount of hydrogen peroxide and liquid fuel supplied into the feed chamber 18 and the combustion chamber 20, respectively.

It will now be understood that essential features of the present invention are to utilize hydrogen peroxide as an oxidizing agent for combustion of fuel, to arrange the feed chamber 18 and the combustion chamber 20 to be in axial alignment with each other such that fuel is fed through them into the venturi postion 48 which is also in axial alignment with the chambers 18 and 20, whereby the power plant is simplified in construction, but the amount of nitrogen oxides in the exhaust gases is significantly reduced thereby promoting emission of cleaner exhaust gases.

Figure 2:
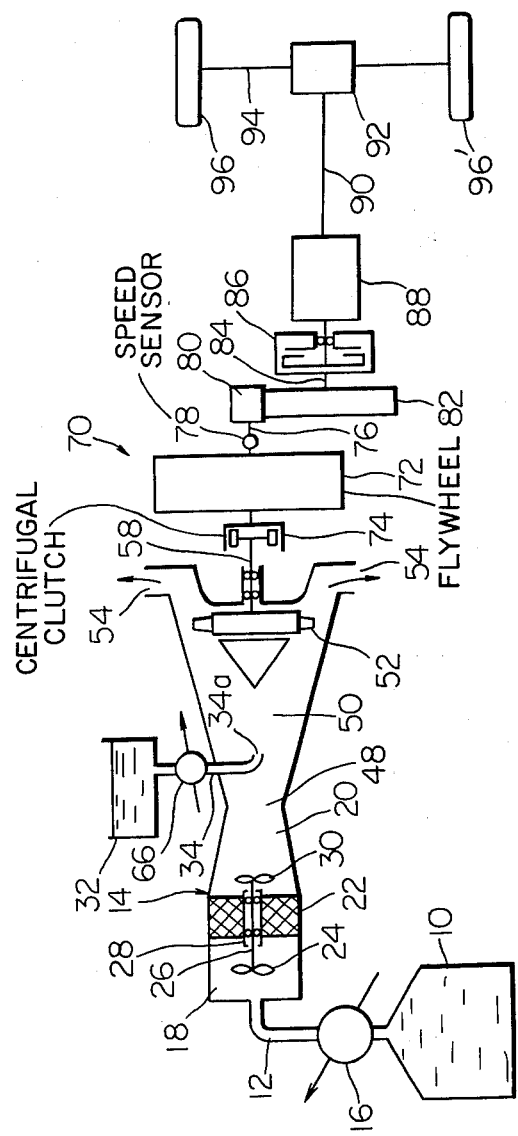
FIG. 2 is a view similar to FIG. 1 but shows another preferred embodiment of the power plant according to the present invention.

According to an additional feature of the present invention, the power plant can be selectively operated in conjunction with an energy storing device which is adapted to store therein excess energy derived from the power plant so that excessive fuel consumption can be reduced. An embodiment carrying out this concept is illustrated in FIG. 2, in which like or corresponding component parts are assigned the same reference numerals as those used in FIG. 1. A main part of the power plant shown in FIG. 2 differs from that of the power plant shown in FIG. 1 in that the fuel pump 36 and the other parts associated therewith are dispensed with while a throttle valve, designated as 66, is disposed in the fuel supply conduit 34 for controlling the flow of fuel supplied into the combustion chamber 20, and in that the air nozzle 56 is dispensed with. In the illustrated embodiment of FIG. 2, the power plant further comprises an energy storing device 70 which is adapted to store therein excess energy derived from the output shaft 58.

The energy storing device 70 is comprised of a flywheel 72 which is coupled to the output shaft 58 through a centrifugally operated clutch 74. The centrifugally operated clutch 74 may be of any suitable construction insofar as it functions to provide drivable connection between the output shaft 58 and the flywheel 72 when the rotational speed of the output shaft 58 is above a predetermined level. The flywheel 72 is connected to a shaft 76, on which a speed sensor 78 is mounted. The speed sensor 78 may be of any known construction, and is electrically connected to the throttle valves 16 and 66 located in the conduits 12 and 34, respectively, although this connection is not shown. The speed sensor 78 is responsive to the rotational speed of the flywheel 72, and generates an electrical signal when the sensed speed exceeds a predetermined level of, for example, 20,000 rpm. This electrical signal is then supplied to the throttle valves 16 and 66, which are consequently closed to shut off the supply of hydrogen peroxide and fuel into the feed chamber 18 and the combustion chamber 20, respectively. Thus, hot gases are not produced in the combustion chamber 20 of the casing 14, and, accordingly, the rotational speeds of the turbine wheel 52 and the output shaft 58 are decreased so that the centrifugally operated clutch 74 is caused to be uncoupled. Under these circumstances, the flywheel 72 continues to rotate due to its inertial force, and supplies power to the shaft 76.

In the illustrated embodiment of FIG. 2, the shaft 76 is shown as being connected to a gear 80, which meshes with a gear 82 mounted on the shaft 84. The shaft 84 is connected through a fluid coupling 86 to a multiple-speed power transmission 88, which in turn is connected through a propeller shaft 90 to a differential gear 92. The differential gear 92 is mounted on a wheel supporting means such as an axle 94 of driving wheels 96 and 96' of a vehicle.

Still another preferred embodiment of a power plant according to the present invention is illustrated in FIG. 3, in which like or corresponding component parts are designated by the same reference numerals as those used in FIG. 2. In this illustrated embodiment, the energy storing device 70 further comprises an electrical generator 98 which is coupled through a coupling 100 to the flywheel 72, and which is electrically connected through leads 102 to an electric motor 104. The electric motor 104 is connected to the differential gear 92 of an electrical motor vehicle. The electrical generator 98 is also electrically connected through leads 106 to a battery 108, which in turn is electrically connected through leads 110 to the electric motor 104. With this arrangement, the electrical generator 98 is continuously driven by the flywheel 72 through the shaft 76 so that electrical power is produced thereby. Electrical power is then supplied to the electric motor 104 from the electrical generator 98 through the leads 102, and the electric motor 104 is energized to drive the differential gear 92 and accordingly the driving wheels 96 and 96' of the electrical motor vehicle. Thus, it is to be noted that electrical power is directly supplied from the electrical generator 98 to the electric motor 104 during normal running conditions of the motor vehicle, and excess electrical power is utilized to increase the amount of electrical energy stored in the battery 108. During acceleration conditions of the motor vehicle, the electric motor 104 receives electrical power from the battery 108 through the leads 110 so that the electric motor 104 delivers increased power to the driving wheels 96 and 96'.

It will now be understood from the foregoing description that the power plant according to the present invention is simple in construction and easy to manufacture because it is comprised of a minimum number of component parts.

It will also be noted that the power plant embodying the present invention is so constructed as to discharge exhaust gases which contain no nitrogen oxides.

Although in the embodiments of FIGS. 2 and 3 the power plants have been shown and described as being applied to a motor vehicle by way of example only, it should be appreciated that the power plant embodying the present invention can be also utilized for driving ships, aircraft, external electrical generators, emergency electrical power sources and/or portable electrical generators for electrical equipment.

What is claimed is:

1. A power plant driven by a flow of high-temperature gases comprising, in combination, a source of hydrogen peroxide, a casing, a feed chamber formed in said casing and communicating with said source of hydrogen peroxide, a combustion chamber formed in said casing and axially aligned with said feed chamber, a catalyst disposed in said casing between said feed chamber and said combustion chamber and decomposing hydrogen peroxide supplied from said source of hydrogen peroxide into said catalyst and producing water vapor and oxygen, a shaft rotatably supported by said casing, said shaft extending into said feed chamber and said combustion chamber, a turbine rotatably connected at one end of said shaft extending into said combustion chamber, a pump rotatably connected at the other end of said shaft extending into said feed chamber, said turbine being driven by a mixed gas of said water vapor and said oxygen gas formed by decomposing said hydrogen proxide, a venturi portion leading from said combustion chamber, a source of fuel communicating with said combustion chamber for supplying thereinto fuel to be combusted by said oxygen gas for producing high-temperature gases, a gas flow passageway communicating with said venturi portion to pass said high-temperature gases therethrough, a turbine wheel having blades exposed to the flow of said high-temperature gases in said gas flow passageway and driven by said flow, a fuel pump disposed between said source of fuel and said combustion chamber for feeding fuel thereinto, a rotary shaft connected at its one end to said fuel pump, a turbine connected to the other end of said rotary shaft, and a water vapor chamber in which said last-mentioned turbine is located, said water vapor chamber communicating with said combustion chamber to receive said water vapor and oxygen, whereby said last-mentioned turbine is rotated thereby driving said fuel pump.

2. A power plant as claimed in claim 1, further comprising a flow control valve disposed between said water vapor chamber and said combustion chamber for controlling the flow of said water vapor and oxygen.

3. A power plant as claimed in claim 2, further comprising a throttle valve disposed between said source of hydrogen peroxide and said feed chamber to control the flow rate of hydrogen peroxide suppled thereinto.

4. A power plant as claimed in claim 3, further comprising an air nozzle communicating with said venturi portion and vented to the atmosphere for introducing air thereinto to reduce the temperature of said high-temperature gases to a proper level and to increase the volume of said high-temperature gases acting on said turbine blades of said turbine wheel.

5. A power plant driven by a flow of high-temperature gases comprising, in combination, a source of hydrogen perioxide, a casing, a feed chamber formed in said casing and communicating with said source of hydrogen peroxide, a combustion chamber formed in said casing and axially aligned with said feed chamber, a catalyst disposed in said casing between said feed chamber and said combustion chamber and decomposing hydrogen peroxide supplied from said source of hydrogen peroxide into said catalyst and producing water vapor and oxygen, a shaft rotatably supported by said casing, said shaft extending into said feed chamber and said combustion chamber, a turbine rotatably connected at one end of said shaft extending into said combustion chamber, a pump rotatably connected at the other end of said shaft extending into said feed chamber, said turbine being driven by a mixed gas of said water vapor and said oxygen gas formed by decomposing said hydrogen peroxide, a venturi portion leading from said combustion chamber, a source of fuel communicating with said combustion chamber for supplying thereinto fuel to be combusted by said oxygen gas for producing high-temperature gases, a gas flow passageway communicating with said venturi portion to pass said high-temperature gases therethrough, a turbine wheel having turbine blades exposed to the flow of said high-temperature gases in said gas flow passageway and driven by said flow, a first throttle valve disposed between said source of hydrogen peroxide and said feed chamber for controlling the flow rate of hydrogen peroxide supplied thereto, a second throttle valve disposed between said source of fuel and said combustion chamber for controlling the flow rate of fuel supplied thereto, and an energy storing device including a flywheel connected to an output shaft of said turbine wheel to store therein energy.

6. A power plant as claimed in claim 5, further comprising a centrifugally operated clutch which is disposed between said output shaft and said flywheel.

7. A power plant as claimed in claim 6, in which said energy storing device further includes an electrical generator connected to and driven by said flywheel.

* * * * *